F. BRÄUNLICH.
PROCESS OF MAKING ANHYDROUS TETRACHLORID OF TIN FROM DIOXID OF TIN.
APPLICATION FILED JAN. 13, 1912.
1,039,356.
Patented Sept. 24, 1912.
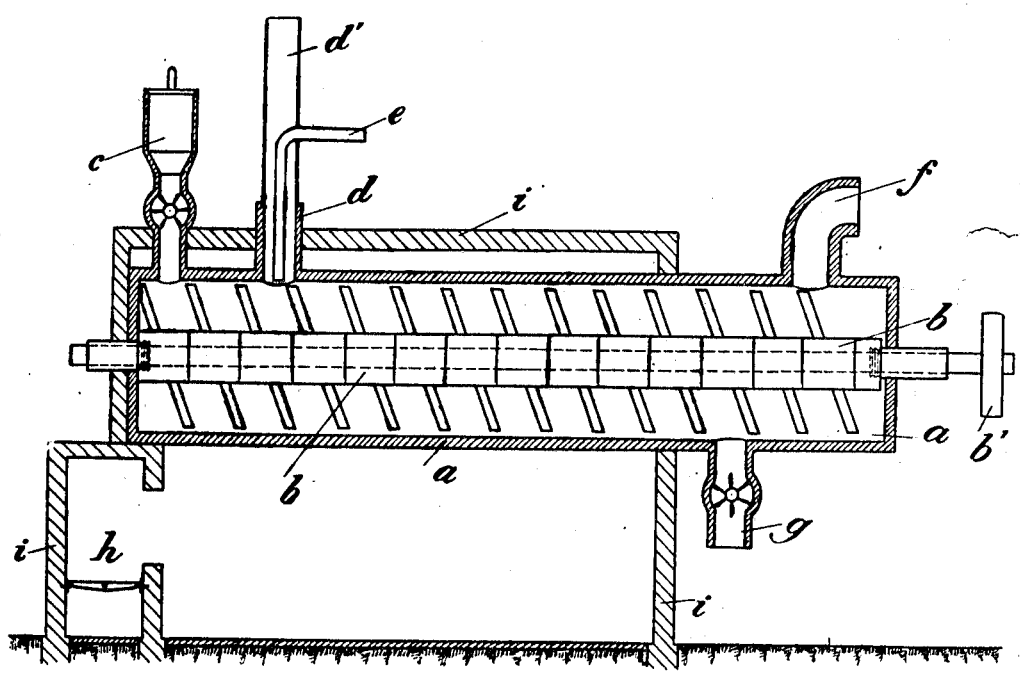

UNITED STATES PATENT OFFICE.

FRITZ BRÄUNLICH, OF BRÜNN, AUSTRIA-HUNGARY.

PROCESS OF MAKING ANHYDROUS TETRACHLORID OF TIN FROM DIOXID OF TIN 1,039,356.

Specification of Letters Patent. Patented Sept. 24, 1912.

Application filed January 13, 1912. Serial No. 671,121.

*To all whom it may concern:*

Be it known that I, FRITZ BRÄUNLICH, chemist, citizen of Austria, residing at Brünn, county of Moravia, Austria-Hungary, have invented a new and useful Process of Making Anhydrous Tetrachlorid of Tin from Dioxid of Tin; and I do hereby declare the following to be a full, clear, and exact description of the same.

The subject-matter of my invention is an improved process of making anhydrous tetrachlorid of tin from dioxid of tin.

I have found that dioxid of tin, $SnO_2$, is directly and quantitatively converted into tetrachlorid of tin, $SnCl_4$, when the finely pulverized, preferably moving oxid is subjected at an elevated temperature to the action of acetylene and clorin. The reaction takes place without difficulty, finely divided carbon or soot being separated in the reaction chamber.

My process may be carried into practice, for example, by exposing at an elevated temperature, finely pulverized anhydrous dioxid of tin, mixed or briqueted either by itself or with an indifferent material, and contained in a receptacle provided with an agitating device, to the successive or simultaneous or alternate action of dry acetylene and gaseous chlorin until it is completely converted into the chlorid. The tetrachlorid of tin which distils over is collected in well cooled receivers and rectified until it is completely purified. In order to preclude the danger of explosion, and with the simultaneous reaction of acetylene and chlorin, the introduction of the two gases can be so effected that their mixture only takes place within the pulverized $SnO_2$—perhaps under pressure—whereby, due to the lack of sufficient explosion space, explosions cannot occur. In the successive or alternate reaction of acetylene and chlorin, one gas can, for the same purpose be expelled previously by an inert gas, for instance nitrogen, as it is possible to conduct the entire process in a vacuum or in the presence of an inert gas.

The soot collected in the reaction chamber is purified and employed as such.

The accompanying drawing shows a central vertical section of an apparatus which has been found suitable for carrying out this process.

In a cylindrical iron receptacle $a$, which is coated inside with a material which is not attacked by chlorin, an agitator $b$ is rotatably mounted and is actuated by means of a belt pulley $b'$ which is keyed upon the prolonged end of its shaft. At the upper side of the cylindrical receptacle $a$ are provided (1) an upright feed hopper $c$ through which the cylindrical receptacle $a$ is continuously supplied with $SnO_2$ (dioxid of tin), (2) an upright tube $d$ in which is inserted a pipe $d'$ through which acetylene is introduced into the apparatus. The wall of the pipe $d'$ is pierced by a bent pipe $e$ which also opens into the upright tube $d$. Chlorin is introduced through this pipe $e$. Acetylene and chlorin can be introduced simultaneously or alternately, and also (3) an upright tube $f$ through which the tetrachlorid of tin which forms ($SnCl_4$) can escape to the open. On the lower side of the cylindrical receptacle $a$ is provided a pipe $g$ through which the soot which forms is withdrawn. The cylindrical receptacle $a$ rests preferably on masonry or the like $i$, in the forward part of which is provided a fire place $h$ by which the receptacle $a$ is heated and hence its contents brought to a higher temperature.

The suitable temperature at which the process is carried out is from 200 to 400° centigrade.

The reaction is expressly the following equation:

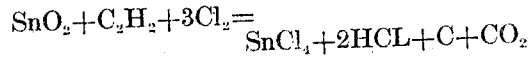
$$SnO_2 + C_2H_2 + 3Cl_2 = SnCl_4 + 2HCL + C + CO_2$$

I claim:—

1. The hereindescribed process of making anhydrous tetrachlorid of tin, which consists in exposing dioxid of tin at an elevated temperature to the action of acetylene and chlorin.

2. The hereindescribed process of making anhydrous tetrachlorid of tin, which consists in exposing dioxid of tin at an elevated temperature to the successive action of acetylene and chlorin.

3. The hereindescribed process of making anhydrous tetrachlorid of tin, which consists in exposing dioxid of tin at an elevated temperature to the alternating action of acetylene and chlorin.

In testimony whereof I have signed my name to this specification in the presence of two subscribing witnesses.

FRITZ BRÄUNLICH.

Witnesses:
 MORITZ SCHMOLKA,
 RUDOLF HARTOCHEA.

Copies of this patent may be obtained for five cents each, by addressing the "Commissioner of Patents, Washington, D. C."